3,067,224
RARE EARTH SALTS OF PHOSPHORIC
ACID DIESTERS
John P. Pellegrini, Jr., and Harold O. Strange, Pittsburgh, Pa., assignors to Gulf Research & Development Company, Pittsburgh, Pa., a corporation of Delaware
No Drawing. Filed Dec. 31, 1958, Ser. No. 784,023
10 Claims. (Cl. 260—429.2)

This invention relates to a novel class of metal salts of the substituted acids of phosphorus which are useful as addition agents to lubricating oils and petroleum fuels. More particularly, the invention relates to the rare earth metal salts of an organic substituted acid of phosphorus. By the term "rare earth metal salts," we mean the salts of the elements of atomic members 57 to 71, inclusive. The "rare earth" elements thus include lanthanum, cerium, praseodymium, neodymium, samarium, europium, gadolinium, terbium, dysprosium, holmium, erbium, thulium, ytterbium and lutecium.

The rare earth metal salts of the organic substituted acids of phosphorus of the invention are represented by the structural formula:

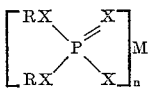

where X is selected from the group consisting of oxygen and sulfur; R is a substituent selected from the class consisting of alkyl, alkenyl, alkynyl, aryl, aralkyl, alkaryl, cycloalkyl, alkoxyalkyl, alkoxyaryl, aryloxyalkyl and aryloxyaryl groups; M is a metal having an atomic number of 57 to 71, inclusive; $n$ is the valence of the rare earth metal M; and wherein the total number of carbon atoms in the radical

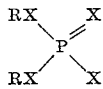

is at least 6.

The rare earth metal salts of the invention can be prepared by any suitable method. According to one embodiment, the rare earth metal salt of an organic substituted acid of phosphorus is formed by reacting a basic rare earth metal compound with a substituted oxy or sulfur containing acid of pentavalent phosphorus of the following type formula:

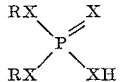

where R is a substituent selected from the class consisting of alkyl, alkenyl, alkynyl, aryl, aralkyl, alkaryl, cycloalkyl, alkoxyalkyl, alkoxyaryl, aryloxyalkyl, and aryloxyaryl groups; X is oxygen or sulfur; and wherein the total number of carbon atoms in the R groups is at least 6. Substituted acids of phosphorus containing at least 9 carbon atoms are preferred. Examples of preferred acids are aliphatic substituted oxy phosphoric acids having at least 9 carbon atoms. However, it is to be understood that the broader aspects of the invention include other types of substituted acids of phosphorus containing less than 9 carbon atoms.

In all of the above formulae, the R groups may be alike or different. Specific examples of some of the rare earth metal salts of the organic substituted acids of phosphorus, illustrating the compounds of the invention include the lanthanum, cerium, praseodymium, neodymium, samarium, europium, gadolinium, terbium, dysprosium, holminum, erbium, thulium, ytterbium and lutecium salts of diallyl, dipropyl, ethyl butyl, methyl amyl, di-n-butyl, di-isobutyl, di-sec-butyl, di-tert-butyl, diamyl, dihexyl, ethyl hexynyl, ethyl hexyl, di-n-octyl, methyl n-octyl, ethyl n-octyl, n-propyl n-octyl, di-isooctyl, isopropyl isooctyl, allyl isooctyl, isoamyl, isooctyl, dinonyl, methyl nonyl, ethyl nonyl, propyl nonyl, di-decyl, methyl, decyl, ethyl decyl, propyl decyl, di-n-dodecyl (dilauryl), ethyl n-dodecyl (ethyl lauryl), allyl dodecyl, di-tetradecyl, ethyl tetradecyl, di-n-hexadecyl, ethyl n-hexadecyl, di-n-octadecyl (distearyl), ethyl n-octadecyl (ethyl stearyl), allyl n-octadecyl, di-n-octadecenyl, ethyl n-octadecynyl,, ethyl n-octadecenyl (ethyl oleyl), di-n-octadecadienyl (dilinoleyl), ethyl n-octadecadienyl (ethyl linoleyl), dieicosyl, ethyl eicosyl, dibenzyl, ethyl benzyl, diphenyl, ethyl phenyl, octyl phenyl, dicresyl, dixylyl, dicyclohexyl, dibutoxyethyl, dibutoxyphenyl, diphenoxyethyl and diphenoxyphenyl esters of o-phosphoric and thiophosphoric acids.

We have that a lubricating oil, such as a mineral oil or a synthetic oil (i.e., a compound or composition of non-mineral origin having a majority of the properties of a mineral oil of lubricating grade), can be improved with respect to its viscosity and viscosity index characteristics by incorporating a small amount of a rare earth metal salt of a diester of o-phosphoric acid in the oil. For example, we have found that a rare earth metal salt of a diester of o-phosphoric acid imparts excellent viscosity index improving characteristics to a mineral oil and that the oil thus improved retains its high viscosity index even when subjected to vigorous agitation and high shear rates and stresses. We have found further that a lubricating composition comprising a major amount of a mineral oil and a minor amount of a rare earth metal salt of a diester of o-phosphoric acid has a greatly improved pour point. In regard to synthetic oils, we have found that the addition of a small amount of a rare earth metal salt of a diester of o-phosphoric acid of this invention to a synthetic lubricant comprising an ester of an aliphatic dibasic acid increases the viscosity and viscosity index of the lubricant. We have found further that a lubricating composition comprising a major amount of an aliphatic dibasic acd ester and a minor amount of a rare earth metal salt of a diester of o-phosphoric acid has a surprising viscosity characteristic in that the viscosity of the lubricating composition increases to a maximum as the temperature of the composition increases above about 100° F. The synthetic lubricating composition containing a compound of the invention has a further surprising characteristic in that its viscosity index increases when subjected to vigorous agitation and high shear rates and stresses even though such treatment gives rise to a slight decrease in its viscosity.

The mineral lubricating oil to which the rare earth metal salt of a diester of o-phosphoric acid of the invention can be added is advantageously a highly refined paraffinic oil. By the term "highly refined paraffinic oil" we mean a petroleum lubricating oil which has been refined by one of the more drastic refining methods known in the art, for example, by conventional aluminum chloride refining or by solvent extraction adapted to remove all or substantially all of the unsaturated and naphthenic constituents of the oil. Aluminum chloride refined or solvent extracted paraffinic base oil, such as a Pennsylvania oil, provides an excellent base oil for the composition of the invention. However, drastically refined Mid-Continent and Gulf Coastal oil may also be used. While the highly refined paraffinic oils are particularly desirable for use in forming crankcase lubricants we do not wish to limit the use of the compounds of the invention to these oils alone, however, inasmuch as the rare earth metal salt of a diester of o-phosphoric acid as hereinafter defined is also useful in improving the viscosity index and pour point of oils derived from naphthenic and asphaltic crudes.

The synthetic lubricating oil to which the rare earth metal salt of a diester of o-phosphoric acid of the invention can be added is advantageously an aliphatic dibasic acid ester having a majority of the properties of a mineral oil of lubricating grade. If desired, a mixture of esters may be employed instead of a single ester. While compounds of the invention are particularly effective in ester lubricants having initial viscosities which are too low for use as a lubricant in certain applications such as in lubricating gears in turbo-prop engines, we do not wish to indicate that the compounds of the invention are limited in this regard inasmuch as the rare earth metal salts of the type disclosed more fully hereinbelow have the property of increasing the viscosity of all ester lubricants and other synthetic lubricants in which the rare earth metal salts are soluble or colloidally dispersible. Ordinarily the initially more viscous esters are used in producing lubricants which are subjected to more severe operating conditiions of temperature and pressure. However, esters having initially low viscosities can similarly be employed, their ultimate viscosity being adjusted by the amount of the rare earth metal salt used and also by the particular rare earth salt selected. In addition to possessing a majority of the properties of a mineral lubricating oil, the ester lubricants should be substantially neutral. Free acids tend to catalyze the oxidation of the esters, resulting in compounds which are corrosive to metals. Therefore, to produce a lubricating composition which is stable and which is substantially non-corrosive to metals, we employ esters preferably having a neutralization number below about 0.2.

Exemplary of some of the esters to which the rare earth metal salts of the invention can be added are the diesters of aliphatic dibasic acids and alcohols containing at least four aliphatic carbon atoms, preferably between 6 and 16 carbon atoms.

Specific examples of some of the alcohols which can be used in preparing the aliphatic dibasic acid esters are 1-butanol; 2-butanol; 2-methyl-2-propanol; 1-pentanol; 2-pentanol; 2-methyl-2-butanol; 1-hexanol; 2-hexanol; 3-hexanol; 2-methyl-1-pentanol; 3-methyl-1-pentanol; 4-methyl-1-pentanol; 2,4-dimethyl-2-pentanol; 2,3-dimethyl-3-pentanol; 2,4-dimethyl-3-pentanol; 3-ethyl-3-pentanol; 2-methyl-1-hexanol; 5-methyl-1-hexanol; 2-methyl-2-hexanol; 5-methyl-2-hexanol; 3-methyl-3-hexanol; 5-methyl-3-hexanol; 1-heptanol; 2-heptanol; 4-heptanol; 2-methyl-2-heptanol; 3-methyl-2-heptanol; 4-methyl-4-heptanol; 2-ethyl-1-hexanol; 3-ethyl-3-hexanol; 3-ethyl-2-methyl-3-pentanol; 1-octanol; 2-octanol; 2-methyl-2-octanol; 2,6-dimethyl-4-heptanol; 4-ethyl-4-heptanol; 3-ethyl-5-methyl-3-heptanol; 1-nonanol; 2-nonanol; 3-nonanol; 4-nonanol; 5-nonanol; 2-methyl-1-nonanol; 3,7-dimethyl-1-octanol; 3-ethyl-3-octanol; 4-propyl-4-heptanol; 3-isopropyl-5-methyl-1-hexanol; 1-decanol; 4-decanol; lauryl alcohol; myristic alcohol; cetyl aclohol; stearyl alcohol; glycol; glycerol; and the like, as well as mixtures of two or more of such alcohols.

The so called "oxo" octyl alcohols, which, as is known, are highly branched-chain saturated aliphatic monohydric alcohols prepared by the "Oxo" process exemplify a class of commercially available alcohol mixtures which are suitable for use in preparing synthetic lubricating oils to which the compounds of the invention can be added. The Oxo process, briefly, involves the hydroformylation of olefinic hydrocarbons, followed by hydrogenation of the carbonylic compounds thus obtained. Normally, the olefinic hydrocarbons used in the manufacture of oxo-octyl alcohols are prepared by condensation of $C_3$ and $C_4$ olefins in the usual proportion in which they occur in petroleum refinery gases. In this case, oxo-octyl alcohols normally will contain a mixture of branched-chained isomers of octyl alcohol, and the mixture will consist mostly of isomeric dimethylhexanols. Although the above-indicated composition is the most common for oxo-octyl alcohols, it will be appreciated that the proportions of the mixed isomeric alcohols can be varied to some extent by varying the proportions of the $C_3$ and $C_4$ olefins used in preparing the $C_7$ olefin to be hydroformylated.

Specific examples of some of the dibasic acids with which the above-enumerated alcohols can be reacted in preparing the esters for use according to the present invention are oxalic, malonic, succinic, isosuccinic, glutaric, ethyl malonic, pyrotartaric, adipic, pimelic, suberic, azelaic, sebacic, and phthalic acid. When a low molecular weight acid is esterified, a high molecular weight alcohol is preferred in order to produce an ester having a majority of the properties of a mineral oil of lubricating grade. While the diesters of the aliphatic dibasic acids are preferred, the esters of aromatic dibasic acids such as the phthalic acid ester of a material such as castor oil or other high molecular weight alcohols can also be used.

Specific examples of preferred synthetic lubricants to which the rare earth metal salt of a diester of o-phosphoric acid of the invention is added are the substantially neutral esters of hexyl, octyl, decyl, lauryl, myristic and cetyl alcohols and adipic, pimelic, suberic, azelaic and sebacic acids. Specific examples of especially effective ester lubricants are di-2-ethylhexyl azelate, di-2-ethylhexyl sabacate, di-isooctyl azelate and di-isooctyl sebacate.

The esters can be prepared by any of the methods known in the art. According to one method, as described in U.S. Patent No. 2,091,241 which issued on August 24, 1937, to H. M. Kvalnes, a dicarboxylic acid or its anhydride is dissolved in an inert solvent, after which the resulting mixture is heated to its boiling point. While maintaining the mixture at its boiling point, an alcohol to give the desired ester is added gradually. When addition of the alcohol is completed, the solvent is distilled off and esterification is carried out at a temperature above 150° C. According to another suitable method, the alcohol and acid are reacted at an elevated temperature in the presence of a sulfuric acid catalyst. As the reaction proceeds, water is continuously removed by azeotropic distillation with a solvent such as benzene or toluene. When the reaction is substantially complete, the product is washed with dilute alkali to remove any acidic substances. Purification of the product may be accomplished by fractional distillation.

The rare earth metal salts of the phosphoric acid esters which form a preferred group of compounds are those which are soluble in the oil and insoluble in water. In this regard, a rare earth metal salt of a diester of o-phosphoric acid wherein the ester substituents comprise one short chain aliphatic radical and one long chain aliphatic radical are especially preferred. The short chain radical preferably contains from 1 to 3 carbon atoms and the long chain radical preferably contains from 8 to 20 carbon atoms. The optimum length of the respective chains to insure oil solubility is somewhat dependent upon the particular oil in which the compound is to be incorporated. The limit of solubility is believed to be reached when the long aliphatic chain contains from 14 to 16 carbon atoms for a saturated group and from 18 to 20 carbon atoms or more for an unsaturated group.

The rare earth metal salt of the diester of o-phosphoric acid can be prepared by any suitable method. According to a preferred procedure, the rare earth metal salt of the o-phosphoric acid ester is prepared by reacting a basic rare earth metal compound with an acidic o-phosphoric acid ester. The rare earth metal compound is employed in an amount sufficient to effect complete neutralization of the o-phosphoric acid ester. In some instances, the neutralization reaction takes place spontaneously, or substantially so, with the evolution of heat. In other instances, however, it is required to add additional heat to effect complete neutralization. In effecting complete neutralization, it is preferred to maintain the reaction temperature below about 220° F. in order to avoid appreciable decomposition of the resulting salt. After salt formation is substantially complete, the mixture is further heated for a time sufficient to expel the water in neutralization. The use of a slight vacuum at this point facilitates dehydration. Thereafter, the dehydrated product is filtered to separate out any unreacted rare earth metal compound. In some instances, it is desirable to prepare an alkali metal salt of the organic phosphate and thereafter prepare the rare earth metal salt by metathesis of the alkali metal salt with a water-soluble salt of the rare earth metal such as the nitrate, chloride or sulfate, as appropriate.

The rare earth metal compound used in preparing the corresponding metal salt of the diester of o-phosphoric acid can be either a relatively pure compound or it can be a mixture of the rare earth compounds such as are found in monazite and bastnasite. The following table shows the composition of rare earths in typical commercial rare earth salts.

TABLE I

| | Composition of rare earths, weight percent as oxides | | | | | |
|---|---|---|---|---|---|---|
| | $CeO_2$ | $La_2O_3$ | $Pr_6O_{11}$ | $Nd_2O_3$ | $Sm_2O_3$ | Others |
| Rare earth salts from monazite | 48 | 24 | 6 | 19 | 2 | 1 |
| Rare earth salts from vastnasite | 48 | 37 | 3.5 | 10 | 1 | 0.5 |

While the individual rare earth metal oxides can successfully be employed in preparing the salt of the diester of o-phosphoric acid, compounds of the individual elements are more expensive because of the increasing difficulty of separating the individual elements. Therefore, from an economic standpoint it is frequently desirable to prepare a mixture of the rare earth metal salts of a diester of o-phosphoric acid by neutralizing the o-phosphoric acid ester with a mixture of the rare earth oxides.

The acidic o-phophoric esters used in making the rare earth metal salts of the invention also may be prepared in any suitable manner. For example, a mixture of a higher monohydric alcohol containing from 8 to 20 carbon atoms, a monohydric alcohol containing from 1 to 3 carbon atoms and phosphorus pentoxide may be refluxed for several hours. The complex mixture of mono, di and tri esters may be distilled to obtain individual pure compounds.

According to another embodiment, phosphorus oxychloride is reacted with a monohydric alcohol containing from 1 to 3 carbon atoms to form the corresponding phosphoryl dichloride which is thereafter reacted with a monohydric alcohol containing from 8 to 20 carbon atoms to form a phosphoryl monochloride which is subsequently hydrolyzed to form the desired phosphoric acid diester containing a $C_1$ to $C_3$ aliphatic radical and a $C_8$ to $C_{20}$ aliphatic radical. Examples of the short chain alcohols are methyl alcohol, ethyl alcohol, n-propyl alcohol, isopropyl alcohol and allyl alcohol. Exampes of the long chain alcohols are n-octyl, isooctyl, nonyl, decyl, n-dodecyl (lauryl), tetradecyl, n-hexadecyl, n-octadecyl (stearyl), n-octadecenyl (oleyl), n-octadecadienyl (linoleyl) and eicosyl alcohols. The alcohols need not be pure as mixtures of two or more can be used.

Organic phosphates that form the preferred group of rare earth metal salts of this invention are diesters of o-phosphoric acids whose two ester substituents are aliphatic radicals one of which contains from 1 to 3 carbon atoms and the other contains from 8 to 20 carbon atoms. Examples of such organic diesters of phosphoric acids are methyl n-octyl, ethyl n-octyl, n-propyl n-octyl, isopropyl isooctyl, allyl isooctyl, methyl nonyl, ethyl nonyl, propyl nonyl, methyl decyl, ethyl decyl, propyl decyl, methyl dodecyl, ethyl n-dodecyl (ethyl lauryl), allyl n-dodecyl, ethyl tetradecyl, ethyl n-hexadecyl, ethyl n-octadecyl (ethyl stearyl), allyl n-octadecyl, ethyl n-octadecenyl (ethyl oleyl), ethyl n-octadecadienyl (ethyl linoleyl), and ethyl eicosyl esters of o-phosphoric acid.

Specific examples of especially effective viscosity improving agents of the invention are the oil-soluble lanthanum and neodymium salts of ethyl oleyl acid orthophosphates. Other salts included by the invention are the lanthanum, neodymium, praseodymium, cerium and samarium salts of ethyl n-octyl, ethyl isoctyl, ethyl decyl, ethyl n-dodecyl (lauryl), ethyl n-octadecyl (stearyl) and ethyl n-octadecenyl acid orthophosphates.

The rare earth metal salts of the o-phosphoric acid esters of this invention can be prepared and employed per se or they can be prepared in situ or they can be prepared in the form of an oil concentrate. In preparing an oil concentrate, the rare earth metal salt can be prepared either in the oil or in an organic solvent which can be flashed from the oil after formation of the concentrate. Organic solvents suitable for this purpose include hexane, isooctane, naphtha, benzene, toluene, carbon tetrachloride, and the like. When an oil concentrate is prepared first, the concentrate can be added directly to the oil to be improved or it can be admixed with one or more other improving agents. Regardless of whether the rare earth metal salt of the o-phosphoric acid ester is employed per se or in the form of an oil concentrate, an amount is used sufficient to impart the desired characteristics to the oil.

In general, the rare earth metal salts are employed in amounts of about 0.1 to about 5 percent by weight based on the weight of the total oil composition. Amounts in excess of 5 percent are generally undesirable where the oil is to be used as a crankcase lubricant because the oil with such an amount of rare earth metal salt of o-phosphoric acid becomes too viscous for satisfactory use as a crankcase lubricant. Where a more viscous lubricant, such as a lubricant having the consistency of a grease, is desired, then, of course, such larger amounts of rare earth salt would not be undesirable from the standpoint of viscosity. Excellent results have been obtained by the use in petroleum distillates such as, SAE 10 and SAE 25 lubricating oil, of amounts of the salts between 0.1 and 0.5 percent by weight of the composition. Excellent viscosity index improvement has been obtained by the use in an ester of an aliphatic dibasic acid such as, di-isooctyl azelate, of amounts of the lanthanum salt of ethyl oleyl o-phosphate between 0.1 and 0.6 percent by weight of the composition. When the rare earth metal salt is employed in di-isooctyl azelate in an amount in excess of about 0.6 percent, the composition is more viscous at 210° F. than it is at 100° F. When lanthanum ethyl oleyl o-phosphate is employed in amounts between about 0.5 and 1 percent, the viscosity of the di-isooctyl azelate composition increases as the temperature of the composition increases from about 100° to about 150° F. When the amount of the lanthanum salt is increased to about 2.5 percent, the viscosity of the di-isooctyl azelate composition increases to a maximum as the temperature increases to about 175° F. When the amount of the lanthanum salt is increased still further to about 5 percent by weight of the total disooctyl azelate composition, the viscosity of the composition continues to increase with the temperature as the temperature is raised from about 100° to about 200° F. With a cerium salt of ethyl oleyl o-phosphate, the viscosity of the di-isooctyl azelate composition continues to increase even at a temperature above 200° F. It will be understood therefore, that the optimum amount of the rare earth metal salt will vary depending upon the composition to which the salt is added and upon the characteristics desired in the final composition.

The preparation of some of the preferred salts of the invention are illustrated by the following specific examples.

Example I

LANTHANUM ETHYL OLEYL ORTHOPHOSPHATE

Into a 3 liter round bottom flask equipped with a mechanical stirrer, condenser and dropping funnel are placed 89.2 gm. of ethyl oleyl acid ortho- phosphate, 400 ml. of water and 250 ml. of 95% ethanol. To the mixture thus formed are added, with stirring, 9.49 gm. sodium hydroxide in 200 ml. of water. The temperature of the reaction is maintained at about 25° C. To the reaction mass thus formed are slowly added 34.2 gm. of lanthanum nitrate hexahydrate in 200 ml. of water with rapid stirring, the temperature of the metathesis reaction being maintained at about 25° C. A gummy yellow precipitate is formed. The water is decanted from the reaction mass and thereafter the precipitate is dissolved in hexane, solution being facilitated by the application of a small amount of heat. Thereafter, the product is filtered to remove any undissolved solids. Solvent is then stripped from the filtrate. When the solvent is completely removed, an opaque yellowish rubber-like product comprising lanthanum ethyl oleyl phosphate is obtained. Analysis of the product shows it to compare favorably with the theoretical analysis of lanthanum ethyl oleyl orthophosphate as follows:

|  | Found | Theoretical |
|---|---|---|
| Carbon | 60.83 | 56.95 |
| Hydrogen | 10.31 | 9.49 |
| Phosphorus | 5.75 | 7.35 |
| Lanthanum | 10.07 | 11.00 |

Example II

NEODYMIUM ISOAMYL OCTYL ORTHOPHOSPHATE

Into a 250 ml. flask are placed 150 ml. of toluene, 4 grams of neodymium oxide and 10 grams of isoamyl octyl acid orthophosphate. On addition of these materials, some reaction takes place spontaneously as evidenced by the temperature increasing from 26.5° to 34.5° C. The mixture is then heated under reflux for a period of about 3 hours, or until the theoretical amount of water is recovered in a trap such as a Dean-Stark moisture trap. The reaction mass from which the water has been removed is then filtered to remove excess neodymium oxide. The filtrate thus obtained is blue in color. The toluene is then stripped from the filtrate whereupon a blue pasty residue comprising neodymium isoamyl actyl orthophosphate is obtained.

Example III

NEODYMIUM OCTYLPHENYL PHOSPHATE

Into a 250 ml. flask are placed 2 grams of neodymium oxide, 10 grams of 40–60 mixture of mono- and di-octylphenyl acid orthophosphate, 150 ml. of toluene and 10 ml. of water. The mixture is refluxed for about 6 hours and the water is removed as in Example II. The reaction mass is then filtered whereupon a clear solution is obtained. The toluene is then removed from the filtrate whereupon a brown solid is obtained comprising neodymium octylphenyl orthophosphate.

Example IV

NEODYMIUM DICRESYL ORTHOPHOSPHATE

Into a 250 ml. flask are placed 2 grams of neodymium oxide, 10 grams of dicresyl acid othophosphate, 150 ml. of toluene and 10 ml. of water. After refluxing for 6 hours, all of the water is removed and collected in a moisture trap as in Example II. The reaction mass is then filtered whereupon a brown viscous solution is obtained. The toluene is removed under vacuum yielding a dark brown spongy solid comprising neodymium dicresyl orthophosphate.

The following examples illustrate the preparation of oil concentrates of the various preferred rare earth metal salts of o-phosphoric acid esters of the invention. The oil used in the examples is a synthetic oil (di-isooctyl azelate) having as typical characteristics a viscosity of 12.7 and 3.4 centistokes at 100° F. and 210° F., respectively; a viscosity index of 165; a flash point of 455° F.; a fire point of 490° F.; a pour point of −85° F.; and a neutralization number of 0.04 mg. KOH/gm.

Example V

NEODYMIUM ETHYL OLEYL ORTHOPHOSPHATE

Into a 2 liter round bottom flask equipped with a mechanical stirrer and reflux condenser are placed 970 gm. of di-isooctyl azelate. To the mass of synthetic oil are added 4.0 gm. of neodymium oxide and 26.65 gm. of ethyl oleyl o-phosphoric acid with rapid stirring. The addition of several cubic centimeters of water at this point is advantageous in order to increase the speed of the reaction. The reaction mass thus formed is heated at 75° C. for several hours with continued stirring. Heating is continued for from 1 to 3 or 4 hours or until the reaction is substantially complete. When the reaction is complete, the water is removed from the reaction product under a reduced pressure at about 75° to 80° C. The heated solution is then filtered to remove any unreacted neodymium oxide. The filtered oil thus obtained is light in color and is fairly viscous, comprising a 3% solution of neodymium ethyl oleyl orthophosphate in di-isooctyl azelate.

Example VI

LANTHANUM ETHYL OLEYL ORTHOPHOSPHATE

Into a 3 liter round bottom flask are placed 970 gm. of di-isooctyl azelate, 26.7 gm. of di-isooctyl azelate, 26.7 gm. of ethyl oleyl o-phosphoric acid and 4.0 gm. of lanthanuum oxide. To this mixture are added 5 ml. of water followed by heating at 80° C. with stirring for 3 hours. The water is then removed by heating under a vacuum at 80° C. The heated product is then filtered to remove excess lanthanum oxide. When the viscous synthetic oil solution cools it becomes somewhat less viscous, and sufficiently fluid to flow. The product comprises a 3% solution of lanthanum ethyl oleyl orthophosphate in di-isoctyl azelate.

Example VII

LANTHANUM ETHYL LAURYL ORTHOPHOSPHATE

Into a 2 liter round bottom flask are placed 760 gm. of di-isooctyl azelate, 34.6 gm. of ethyl lauryl phosphate and 10 gm. of lanthanum oxide. To this mixture are added 10 ml. of water followed by heating for 4 hours at 95° C. Upon completion of the reaction, the water is removed by heating under a vacuum at about 95° C. The heated product is then filtered to remove excess lanthanum oxide. The viscous filtered oil product which becomes somewhat less viscous when it cools comprises a 5% solution of lanthanum ethyl lauryl orthophosphate in di-isooctyl azelate.

Example VIII

CERIUM ETHYL OLEYL ORTHOPHOSPHATE

Into a 2 liter flask are placed 1170 gm. of di-isooctyl azelate, 26.7 gm. of ethyl oleyl orthophosphate, 30 ml. of water and cerium hydroxide obtained by reacting 17 gm. of cerium nitrate with ammonium hydroxide. The reaction mass is heated to 75° to 80° C. and dehydrated as in the previous examples. The product comprises a 2.5% solution of cerium ethyl oleyl orthophosphate in di-isooctyl azelate.

Example IX

PRASEODYMIUM METHYL OLEYL ORTHOPHOSPHATE

Praseodymium oxide and methyl oleyl orthophosphate are admixed with a small amount of water and added to di-isooctyl azelate as in Example VII. Upon heating and removal of the water as in Example VII, a solution of praseodymium methyl oleyl orthophosphate in di-isooctyl azelate is obtained.

Example X
SAMARIUM ETHYL OLEYL ORTHOPHOSPHATE

The procedure of Example VI is followed except samarium oxide is substituted for lanthanum oxide. The product comprises a solution of samarium ethyl oleyl orthophosphate in di-isoctyl azelate.

Example XI
LANTHANUM ETHYL ISOOCTYL ORTHOPHOSPHATE

The procedure of Example VII is followed except ethyl isooctyl orthophosphate is substituted for ethyl lauryl phosphate. The product comprises a solution of lanthanum ethyl isooctyl orthophosphate in di-isooctyl azelate.

Example XII
NEODYMIUM METHYL EICOSYL ORTHOPHOSPHATE

The procedure of Example V is followed except methyl eicosyl o-phosphoric acid is substituted for the ethyl oleyl o-phosphoric acid. The resulting product comprises a solution of neodymium methyl eicosyl orthophosphate in di-isooctyl azelate.

Example XIII
LANTHANUM PROPYL OLEYL ORTHOPHOSPHATE

The procedure of Example VII is followed except propyl oleyl orthophosphate is substituted for ethyl lauryl phosphate. The resulting product comprises a solution of lanthanum propyl oleyl orthophosphate in di-isooctyl azelate.

Example XIV
LANTHANUM O,O-DIISOOCTYL DITHIOPHOSPHATE

Into a 500 ml. round bottom flask are placed 26.58 gm. o,o-diisooctyl dithiophosphoric acid, 200 ml. toluene, 6.0 gm. lanthanum oxide and 10 ml. water. This mixture is heated at reflux for 5 hours or until the theoretical amount of water is recovered in a trap such as a Dean-Stark moisture trap. The reaction mass is then filtered to isolate the insoluble product in the form of a fine white precipitate.

It will be understood that the foregoing examples are illustrative only and that other rare earth metal salts of diester orthophosphates wherein the ester substituents comprise one short chain aliphatic radical containing from 1 to 3 carbon atoms and one long chain aliphatic radical containing from 8 to 20 carbon atoms can be employed.

Specific examples of such other salts include the europium, gadolinium, terbium, dysprosium, holium, erbium, thulium, ytterbium and lutecium salts of methyl oleyl, ethyl oleyl, propyl oleyl, ethyl isooctyl, ethyl eicosyl and allyl lauryl orthophosphoric acid. Other compounds within the scope of the invention such as the thiophosphates can similarly be prepared by starting with the corresponding esters of thiophosphoric and dithiophosphoric acids. Specific examples of such thiophosphates and dithiophosphates include the lanthanum, cerium, praseodymium, neodymium, samarium, europium, gadolinium, terbium, dysprosium, holmium, erbium, thulium, ytterbium and lutecium salts of methyl oleyl, ethyl oleyl, propyl oleyl, ethyl isooctyl, ethyl eicosyl, allyl lauryl thiophosphates and o,o-diisooctyl dithiophosphates.

While the preparation of the rare earth metal salts according to the procedure given in Examples V to XIII utilizes di-isooctyl azelate as the solvent, it will be understood that the rare earth metal salts of the invention can be obtained in the free state, as in Examples I, II, III, IV and XIV just as readily as they are obtained in oil blends. To obtain the free rare earth metal salt of a diester orthophosphate, a more volatile solvent, such as hexane, benzene, toluene or carbon tetrachloride, is used in place of a synthetic oil and is flashed off either before or after the formation of the rare earth salt. It also will be understood that the solvent oil can be a mineral oil instead of a synthetic oil. When the salt is obtained in the form of an oil concentrate, the oil solvent is preferably the same as the base oil to which the salt is to be added. The use of a different oil solvent may result in an oil concentrate which is difficultly soluble or insoluble in the oil to be improved.

To demonstrate the effectiveness of the preferred rare earth metal salts contemplated by this invention, we have conducted several comparative tests, the results, of which are listed below, with representative mineral oils and a synthetic oil alone and with the same oils blended with various representative rare earth metal salts of diester orthophosphates. These tests were conducted, for example, with highly refined paraffinic mineral oils of SAE 10 and SAE 25 grade and with a synthetic oil comprising an ester of an aliphatic dibasic acid, di-isooctyl azelate. The effect on the viscosity and viscosity index characteristics on the various oils by the addition thereto of various representative rare earth metal salts of diester o-phosphates of the invention is clearly shown by the illustrative data in Tables II and III.

TABLE II

|  | 1 | 2 | 3 | 4 | 5 | 6 | 7 | 8 | 9 | 10 |
|---|---|---|---|---|---|---|---|---|---|---|
| Composition, percent by weight: |  |  |  |  |  |  |  |  |  |  |
| Di-isooctyl azelate | 100 | 99.8 | 99.75 | 99.6 | 99.4 | 99.2 | 99.0 | 97.5 | 97.5 | 95 |
| Lanthanum ethyl oleyl o-phosphate |  | 0.2 | 0.25 | 0.4 | 0.6 | 0.8 | 1.0 | 2.5 |  |  |
| Cerium ethyl oleyl o-phosphate |  |  |  |  |  |  |  |  | 2.5 |  |
| Lanthanum ethyl lauryl o-phosphate |  |  |  |  |  |  |  |  |  | 5.0 |
| Viscosity data: |  |  |  |  |  |  |  |  |  |  |
| Viscosity, cs. at— |  |  |  |  |  |  |  |  |  |  |
| 100° F | 12.69 | [1] 13.1 | 13.36 | [1] 14.0 | [1] 14.8 | [1] 17.5 | 20.2 | 131.9 | [2] 680 | 39.89 |
| 210° F | 3.42 | [3] 5.9 | 5.98 | [3] 7.1 | [3] 10.0 | [3] 17.8 | 40.0 | 800 | [4] 976 | 81.37 |
| Viscosity index | 166 |  | 225 |  |  |  |  |  |  |  |

[1] Viscosity: centipoise at 100° F.  [2] Viscosity: centipoise at 102° F.
[3] Viscosity: centipoise at 215° F.  [4] Viscosity: centipoise at 217° F.

TABLE III

|  | 11 | 12 | 13 | 14 | 15 | 16 | 17 | 18 | 19 | 20 | 21 |
|---|---|---|---|---|---|---|---|---|---|---|---|
| Composition, percent by weight: |  |  |  |  |  |  |  |  |  |  |  |
| SAE 10 mineral oil | 100 |  | 99.9 | 99.75 | 99.75 |  |  |  |  |  |  |
| SAE 25 mineral oil |  | 100 |  |  |  | 99.9 | 99.85 | 99.8 | 99.75 | 99.5 | 99.5 |
| Neodymium ethyl oleyl o-phosphate |  |  | 0.1 | 0.25 |  | 0.1 | 0.15 | 0.2 | 0.25 | 0.5 |  |
| Lanthanum ethyl oleyl o-phosphate |  |  |  |  | 0.25 |  |  |  |  |  | 0.5 |
| Viscosity data: |  |  |  |  |  |  |  |  |  |  |  |
| Viscosity, cs. at— |  |  |  |  |  |  |  |  |  |  |  |
| 100° F | 36.55 | 77.76 | 43.89 | 64.13 | 38.85 | 83.85 | 94.37 | 104.8 | 123.6 | 234.1 | 83.79 |
| 210° F | 5.80 | 9.5 | 7.28 | 12.60 | 12.60 | 10.64 | 12.18 | 14.01 | 16.67 | 30.85 | 18.43 |
| Viscosity index | 110 | 108 | 131 | 152 | 173 | 117 | 123 | 129 | 132 | 133 | 154 |

The data in the above Table II clearly show that the addition of as little as 0.25 percent of the lanthanum salt of ethyl oleyl o-phosphate greatly improves the voscosity index of di-isooctyl azelate. It will be noted further that when amounts of lanthanum ethyl oleyl o-phosphate in excess of about 0.6 percent were employed (Compositions 6, 7 and 8), the compositions were more viscous at 210° F. than they were at 100° F. The thickening effect obtained by increasing temperatures is also illustrated in Compositions 9 and 10 wherein cerium ethyl oleyl o-phosphate and lanthanum ethyl lauryl o-phosphate in amounts of 2.5 and 5.0 percent respectively were added to di-isooctyl azelate. This result is indeed surprising.

The data in the above Table III clearly show that even as little as 0.25 percent of the neodymium and lanthanum salts of ethyl oleyl o-phosphate greatly improves the viscosity index of the mineral oil.

The improvement in pour point obtained when a rare earth metal salt of this invention is added to a mineral oil is shown by the data in Table IV.

TABLE IV

| | ATSM pour point, ° F. |
|---|---|
| SAE 10 mineral oil | +10 |
| SAE 10 mineral oil+0.25% neodymium ethyl oleyl o-phosphate | −20 |
| SAE 10 mineral oil+0.25% lanthanum ethyl oleyl phosphate | +5 |

While the neodymium salt is more effective than the lanthanum salt, the improvement with such a small amount of additive is nevertheless striking.

The surprising effect of heat on a synthetic oil composition containing at least about 0.6 percent of lanthanum ethyl oleyl phosphate is shown by the data in Table V. The effect of heat is also shown in connection with compositions containing the neodymium and cerium salts of ethyl oleyl o-phosphate and lanthanum ethyl lauryl o-phosphate.

salt, the viscosity still continues to increase at a temperature in excess of 215° F.

The ability of a synthetic oil composition contianing a rare earth metal salt of the invention to retain its improved viscosity characteristics even though subjected to prolonged ultrasonic irradiation is demonstrated by the data shown in Table VI. These comparative tests were made with di-isooctyl azelate alone and with the same synthetic oil blended with a representative rare earth metal salt of a diester orthophosphate.

TABLE VI

| Composition—Percent by weight | | 32 | 33 |
|---|---|---|---|
| Di-isooctyl azelate | | 100 | 99.4 |
| Lanthanum ethyl oleyl o-phosphate | | | 0.6 |

| Viscosity data | | | |
|---|---|---|---|
| Irradiation time—Minutes | Viscosity—Cs. and VI[1] at— | | |
| 0 | 100° F | 12.66 | 15.83 |
| | 210° F | 3.40 | 16.72 |
| | VI | 165 | |
| 30 | 100° F | 12.67 | 14.99 |
| | 210° F | 3.43 | 12.05 |
| | VI | 168 | 195 |
| 60 | 100° F | 12.71 | 13.93 |
| | 210° F | 3.41 | 9.70 |
| | VI | 165 | 203 |
| 90 | 100° F | 12.75 | 14.03 |
| | 210° F | 3.42 | 9.76 |
| | VI | 165 | 203 |
| 120 | 100° F | 12.84 | 13.51 |
| | 210° F | 3.44 | 5.90 |
| | VI | 166 | 225 |

[1] Viscosity index.

The improvement obtained in viscosity index by the improving agents of the present invention is clearly shown by the illustrative data in Table VI. It will be noted that while ultrasonic irradiation caused some decrease in the

TABLE V

| | 22 | 23 | 24 | 25 | 26 | 27 | 28 | 29 | 30 | 31 |
|---|---|---|---|---|---|---|---|---|---|---|
| Composition, percent by weight: | | | | | | | | | | |
| Di-isooctyl azelate | 100 | 99.6 | 99.4 | 99.2 | 99.0 | 97.5 | 95.0 | 97.5 | 97.5 | 95.0 |
| Lanthanum ethyl oleyl o-phosphate | | 0.4 | 0.6 | 0.8 | 1.0 | 2.5 | 5.0 | | | |
| Neodymium ethyl oleyl o-phosphate | | | | | | | | 2.5 | | |
| Cerium ethyl oleyl o-phosphate | | | | | | | | | 2.5 | |
| Lanthanum ethyl lauryl o-phosphate | | | | | | | | | | 5.0 |
| Viscosity, centipoise at— | | | | | | | | | | |
| 100° F | 13.0 | 14.0 | 14.8 | 17.5 | 21.4 | 110.2 | 495 | [1] 293 | [1] 680 | [4] 39.89 |
| 150° F | 7.1 | 10.6 | 16.2 | 30.6 | 49.8 | 660 | 2,800 | [2] 307.5 | 692 | |
| 175° F | 6.0 | 9.4 | 14.2 | 27.2 | 45.5 | 720 | 4,500 | | 741 | |
| 200° F | 5.1 | 7.9 | 11.2 | 23.3 | 38.2 | 680 | 5,500 | | 910 | |
| 215° F | 4.7 | 7.1 | 10.0 | 17.8 | 29.0 | 600 | 5,300 | | [3] 976 | [5] 81.37 |

[1] At 102° F.  [2] At 140° F.  [3] At 217° F.  [4] Centistokes.  [5] Centistokes at 210° F.

The data in the above Table V clearly show that when the rare earth metal salts of ethyl oleyl o-phosphate and ethyl lauryl o-phosphate are employed in a synthetic lubricant in amounts in excess of 0.6 percent, a surprising result is obtained in that the lubricant is more viscous at 210° F. than it is at 100° F. The effect of temperature on a synthetic lubricating composition containing a rare earth metal salt of the invention is thus contrary to the effect of temperature on the synthetic base oil alone as well as the effect on oils in general. It will be noted further that when the di-isooctyl azelate contains between about 0.5 and 1 percent of the lanthanum salt of ethyl oleyl o-phosphate, the viscosity increases with temperature to a maximum at about 150° F. When the lanthanum ethyl oleyl o-phosphate is increased to about 2.5 percent, the viscosity continues to increase at temperatures up to about 175° F. When the lanthanum salt is further increased to 5 percent, the viscosity continues to increase at a temperature up to about 200° F. With the cerium viscosity of the composition containing lanthanum ethyl oleyl o-phosphate, both at 100° F. and at 210° F., the irradiated composition in every instance had viscosities above the viscosity of the synthetic oil alone. It will be noted further that the composition containing lanthanum ethyl oleyl o-phosphate has a surprising characteristic in that its viscosity index increases with prolonged ultrasonic irradiation.

The ability of mineral oil compositions containng a rare earth metal salt of the invention to retain their improved viscosity index characteristics even though subjected to prolonged ultrasonic irradiation is demonstrated by the data shown in Table VII. These tests were conducted with a highly refined paraffinic mineral oil of SAE 25 grade. Several comparative tests were made with (1) the mineral oil alone, (2) with the same oil blended with a representative rare earth metal salt of a diester orthophosphate and (3) with the mineral oil containing a commercially available viscosity index improving agent of the polymerized acrylic series.

TABLE VII

| Composition—Percent by weight | 34 | 35 | 36 | 37 |
|---|---|---|---|---|
| SAE 25 mineral oil | 100 | 99.9 | 99.5 | 95.0 |
| Neodymium ethyl oleyl o-phosphate | | 0.1 | 0.5 | |
| Polymerized acrylic ester | | | | 5.0 |

| Viscosity data | | | | | |
|---|---|---|---|---|---|
| Irradiation time—minutes | Viscosity—Cs. and VI at— | | | | |
| 0 | 100° F | 78.81 | 100.2 | 263.0 | 95.54 |
|   | 210° F | 9.51 | 11.97 | 34.29 | 14.34 |
|   | VI | 106 | 115 | 136 | 136 |
| 30 | 100° F | 78.68 | 97.14 | 207.3 | 77.07 |
|    | 210° F | 9.50 | 11.82 | 33.00 | 10.09 |
|    | VI | 106 | 116 | 138 | 118 |
| 60 | 100° F | 79.21 | 95.71 | 218.6 | 75.07 |
|    | 210° F | 9.47 | 11.45 | 32.85 | 9.81 |
|    | VI | 105 | 113 | 137 | 117 |
| 90 | 100° F | 78.19 | 95.00 | 193.0 | 75.61 |
|    | 210° F | 9.49 | 11.56 | 31.50 | 9.92 |
|    | VI | 107 | 116 | 139 | 117 |
| 120 | 100° F | 78.41 | 95.25 | 169.1 | 74.10 |
|     | 210° F | 9.50 | 11.71 | 25.58 | 9.65 |
|     | VI | 107 | 118 | 139 | 116 |

The improvement obtained in viscosity index by the improving agents of the present invention is clearly shown by the illustrative data in Table VII. It will be noted that even after 120 minutes of ultrasonic irradiation, Compositions 35 and 36, retained their improved viscosity indices. Contrariwise, the SAE 25 oil which contained the commercially available polymerized acrylic ester did not retain its initial viscosity index even though the agent was present in amounts 10 to 50 times greater than the improving agent of the invention. It will be noted further that while ultrasonic irradiation caused some decrease in the viscosity of the compositions containing a rare earth metal salt of the invention both at 100° F. and at 210 F., the irradiated compositions in every instance had viscosities considerably above the viscosity of the base oil. On the other hand, the base oil containing the polymerized acrylic ester after ultrasonic irradiation had a viscosity even less than the viscosity of the base oil when measured at 100° F. and substantially the same viscosity when measured at 210° F. The data thus obtained in the ultrasonic shear stability tests indicate that the rare earth metal salts of diester o-phosphates of the invention are surprisingly stable even when subjected to vigorous agitation and high shear rates and stresses.

An inspection of the physical properties of di-isooctyl azelate and the same ester lubricant containing 0.6 percent by weight of lanthanum ethyl oleyl o-phosphate are as follows:

| | Di-isooctyl azelate | Di-isooctyl azelate plus 0.6% lanthanum ethyl oleyl o-phosphate |
|---|---|---|
| Viscosity, SUS at— | | |
| 100° F | 68.6 | 80.6 |
| 210° F | 37.6 | 84.2 |
| Viscosity index | 165 | |
| Flash point, OC: ° F | 455 | 415 |
| Fire point, OC: ° F | 490 | 485 |
| Pour point, ° F | <−75 | <−75 |
| Color, ASTM union | 1 minus | 1 minus |
| Neutralization value ASTM D-974 | 0.04 | 0.53 |
| Ash, ASTM D-482, percent | <0.01 | 0.04 |

In inspection of the physical properties of an SAE 10 mineral lubricating oil and the same lubricating oil containing 0.25 percent by weight of neodymium ethyl oleyl o-phosphate and 0.25 percent by weight of lanthanum ethyl oleyl o-phosphate are as follows:

| | Lubricating oil | Lubricating oil +0.25% neodymium ethyl oleyl o-phosphate | Lubricating oil +0.25% lanthanum ethyl oleyl o-phosphate |
|---|---|---|---|
| Viscosity, SUS at— | | | |
| 100° F | 171 | 297 | 181 |
| 210° F | 45.2 | 68.8 | 68.9 |
| Viscosity index | 110 | 152 | 173 |
| Flash point, OC: ° F | 465 | 450 | 445 |
| Fire point, OC: ° F | 505 | 505 | 495 |
| Pour point, ° F | +10 | −20 | +5 |
| Color, ASTM union | 2 minus | 2 minus | 2 minus |
| Neutralization value ASTM D-974 | <0.01 | 0.17 | 0.11 |
| Ash, ASTM D-482, percent | <0.01 | 0.05 | 0.06 |

In addition to the lubricating oils disclosed above, the rare earth salts of this invention are also useful as addition agents to gasoline, kerosene, diesel fuels, furnace oils, grease compositions, insulating oils, damping fluids, and the like. In addition to the viscosity modifying characteristics previously indicated herein, the compounds of the invention are considered to possess anti-corrosion properties when added to either liquid or solid residual fuels which contain such an amount of vanadium as normally to yield a corrosive vanadium-containing ash upon combustion. Thus, residual petroleum fuels containing vanadium in an amount sufficient to yield a corrosive vanadium-containing ash upon combustion can be rendered substantially non-corrosive by incorporating therein to form a uniform blend of an oil-soluble or oil-dispersible rare earth metal salt of an organic substituted acid of phosphorus of the type included within the broader aspects of the invention. The use of the compound in this connection does not require the compound to be oil soluble so that more freedom is allowed in the selection of the various substituents designated as R in the formulae given hereinabove.

In addition to the agents disclosed herein, the compositions containing the same can have added thereto one or more additional agents, as appropriate, designated to improve one or more properties of the composition. Thus, there can be added an oiliness and extreme pressure agent, an anti-oxidant, a corrosion inhibitor, a foam suppressant, a dye, a sludge inhibitor, a de-icing agent, a dispersant, an anti-knock agent, a lead scavenger, ignition control agents, and the like.

While our invention has been described with reference to various specific examples and embodiments it will be understood that the invention is not limited to such examples and embodiments may be variously practiced within the scope of the claims hereinafter made.

We claim:

1. A rare earth metal salt of a diester of o-phosphoric acid wherein the rare earth metal is an element having an atomic number from 57 to 71 and the ester substituents are selected from the class consisting of alkyl and alkenyl radicals, one of said radicals containing from 1 to 3 carbon atoms and the other of said radicals containing from 8 to 20 carbon atoms.

2. The compound of claim 1 wherein the rare earth metal is lanthanum.

3. The compound of claim 1 wherein the rare earth metal is cerium.

4. The compound of claim 1 wherein the rare earth metal is neodymium.

5. A rare earth metal salt of ethyl oleyl o-phosphoric acid wherein the rare earth metal is an element having an atomic number from 57 to 71.

6. Lanthanum ethyl oleyl o-phosphate.

7. Cerium ethyl oleyl o-phosphate.

8. Neodymium ethyl oleyl o-phosphate.
9. Lanthanum ethyl lauryl o-phosphate.
10. Lanthanum ethyl isooctyl o-phosphate.

References Cited in the file of this patent

UNITED STATES PATENTS

| | | |
|---|---|---|
| 2,369,632 | Cook et al. | Feb. 13, 1945 |
| 2,442,915 | Berger et al. | June 8, 1948 |
| 2,480,673 | Reiff et al. | Aug. 30, 1949 |
| 2,564,241 | Warf | Aug. 14, 1951 |
| 2,796,320 | Speeding et al. | June 18, 1957 |
| 2,824,783 | Peppard et al. | Feb. 25, 1958 |
| 2,859,094 | Schmitt et al. | Nov. 4, 1958 |
| 2,904,568 | Ertelt | Sept. 15, 1959 |
| 2,950,166 | Seaborg et al. | Aug. 23, 1960 |
| 2,958,573 | Gustinson et al. | Nov. 1, 1960 |

OTHER REFERENCES

Warf: "J. Am. Chem. Soc.," vol. 71, pages 3257, 3258, September 1949.

Scadden et al.: "Analytical Chemistry," vol. 25, No. 11, pages 1602–1604, November 1953.

AEC Document ORNL–1903, pages 1, 4, 6, 20, 21, 34, 35, 57, 58, 74, 75, 88–92, 97–102, 104, 117–123. May 13, 1955, declassified August 9, 1956.

ORNL–2346, pages 3, 8, 12–15, July 22, 1957.

UNITED STATES PATENT OFFICE
CERTIFICATE OF CORRECTION

Patent No. 3,067,224                              December 4, 1962

John P. Pellegrini, Jr., et al.

It is hereby certified that error appears in the above numbered patent requiring correction and that the said Letters Patent should read as corrected below.

Column 2, line 18, after "have" insert -- found --; line 41, for "acd" read -- acid --; column 4, line 27, for "sabacate" read -- sebacate --; column 5, line 4, for "in" read -- of --; same column 5, TABLE I, first column, line 4 thereof, for "vastnasite" read -- bastnasite --; column 7, line 48, for "actyl" read -- octyl --; column 8, line 33, strike out "26.7 gm. of di-isooctyl azelate,"; column 11, line 3, for "voscosity" read -- viscosity --; column 12, line 3, for "contianing" read -- containing --.

Signed and sealed this 14th day of May 1963.

(SEAL)
Attest:

ERNEST W. SWIDER
Attesting Officer

DAVID L. LADD
Commissioner of Patents